(12) United States Patent
Okita

(10) Patent No.: US 6,857,622 B2
(45) Date of Patent: Feb. 22, 2005

(54) ERGONOMIC HANDRAIL

(75) Inventor: Yoshifumi Okita, Nagasaki-ken (JP)

(73) Assignee: Qunetto Japan Company Limited, Sasebo (JP)

( * ) Notice: Subject to any disclaimer, the term of this patent is extended or adjusted under 35 U.S.C. 154(b) by 192 days.

(21) Appl. No.: 10/004,541

(22) Filed: Nov. 1, 2001

(65) Prior Publication Data
US 2002/0084403 A1 Jul. 4, 2002

(30) Foreign Application Priority Data

Nov. 2, 2000 (JP) .......................................... 2000-336777
Oct. 16, 2001 (JP) .......................................... 2001-318680

(51) Int. Cl.$^7$ .............................................. E04H 17/14
(52) U.S. Cl. ................................. 256/65.16; 256/65.15
(58) Field of Search ........................... 256/1, 59, 65.01, 256/65.15, 65.16, 19

(56) References Cited

U.S. PATENT DOCUMENTS

| 4,557,467 A | * | 12/1985 | Lin | ............................. 256/59 |
| 4,646,490 A | * | 3/1987 | Naka et al. | ............... 256/59 X |
| 5,197,717 A | * | 3/1993 | Gund | ........................... 256/59 |
| D378,432 S | * | 3/1997 | Raynes | ....................... D25/164 |
| 6,533,251 B1 | * | 3/2003 | Abbaticchio | ............. 256/65.15 |

* cited by examiner

Primary Examiner—John Cottingham
(74) Attorney, Agent, or Firm—Dennis T. Griggs

(57) ABSTRACT

An ergonomic handrail adapted for use with a stairway or in a toilet has a generally wavy shape. It is mounted generally obliquely on a wall to provide an alternating combination of generally vertically and horizontally disposed portions which are disposed generally above steps and risers of the stairway, respectively. The generally vertically and horizontally disposed portions are adapted to be grasped by a user without bending his or her wrist forwardly in ascending and descending a flight of stairs, respectively. This arrangement enables infirm persons such as elderly or disabled persons to grasp it readily and firmly without causing their hands to accidentally slip from grasping engagement with it.

4 Claims, 15 Drawing Sheets

ERGONOMIC HANDRAIL

CROSS-REFERENCE TO RELATED APPLICATIONS

Not applicable

PRIORITY CLAIM UNDER 35 U.S.C. 119

This application claims priority from Japan Application No. 2000-336777 filed Nov. 2, 2000 and Japan Application No. 2001-318680 filed Oct. 16, 2001.

STATEMENT REGARDING FEDERALLY SPONSORED RESEARCH OR DEVELOPMENT

Not applicable.

BACKGROUND OF THE INVENTION

The present invention relates to ergonomic handrails and, more particularly, to a handrail having a generally wavy shape that enables infirm persons such as elderly and disabled persons to grasp it readily and firmly without causing their hands to accidentally slip from grasping engagement therewith. The invention also relates to a handrail assembly for assisting a person when sitting or standing relative to a fixed structure such as a toilet or a bathtub.

In most modern buildings, it is common to provide a handrail extending along a wall or a stairway to facilitate the movement of persons there along. Also, facilities such as hospitals, nursing homes and private homes for elderly or disabled persons make extensive use of handrails so that infirm persons can grasp them for support when moving around or for assistance when lifting themselves onto or from a toilet. Such a handrail is particularly helpful to them in a bathroom in supporting themselves during bathing and getting in and out of the tub.

Conventionally, such handrails comprise a length of solid or tubular material which is generally straight or L-shaped. A handrail is generally supported on a wall by conventional supports so that it extends obliquely along a stairway. During ascending or descending a flight of stairs, users usually reach downward to grasp onto the handrail by bending their wrist forwardly. This forward bending movement of the wrist tends to prevent the users from gripping the handrail firmly thus increasing the risk of accidental slippage of their hands from grasping engagement therewith.

Handrails disposed in bathrooms, toilets, foyers or the like generally include vertically extending sections which users grasp for support during sitting down or standing up. When the user lifts oneself onto or from a toilet, he or she grasps and holds onto the vertical section and then stretches or bends both arms gradually so that he or she can move toward or from the toilet seat. However, the disadvantage with such handrails is that infirm persons must be strong enough to pull themselves up and support their own weight during sitting down on or standing up from the toilet seat. Handrails will not help such infirm persons who are too weak or incapacitated.

Disposing a straight handrail obliquely rather than vertically or horizontally seems to result in a viable solution which does not require stretching of the arms during sitting down. However, in this case, one would grasp the handrail in the same manner as described in connection with the handrail for a stairway. The inability to grip the handrail firmly would increase the risk of injury by the user falling onto the toilet.

Therefore, there is a need for a handrail that is configured to enable infirm persons to grasp it readily and firmly without causing their hands to accidentally slip from grasping engagement therewith.

There is another need for a handrail that can assist elderly or disabled persons in lifting themselves onto or from a toilet.

There is a further need for a handrail that is particularly helpful to such persons in a bathroom in supporting themselves during bathing and getting in and out of the tub.

BRIEF SUMMARY OF THE INVENTION

In order to achieve the above and other objects of the invention, a handrail assembly is provided that includes a handrail having a generally wavy shape, and having an alternating combination of generally upwardly curved sections and generally downwardly curved sections; and means for mounting the handrail relative to a structure so that it is readily engaged by the hand of a user. The handrail assembly may further comprise a plurality of generally straight sections each interposed between two adjacent, generally upwardly and downwardly curved sections, the axes of two adjacent ones of said generally straight sections intersecting with each other at an obtuse angle. Also, the handrail assembly may further comprise at least one straight section disposed near one end thereof.

In accordance with another embodiment of the invention, there is provided a handrail assembly adapted for use with a stairway, including a handrail having a generally wavy shape; and including a means for mounting the handrail obliquely along a stairway to provide an alternating combination of generally horizontally disposed portions and generally vertically disposed portions, the generally vertically disposed portions being adapted to be grasped by a user without bending his or her wrist forwardly in ascending a flight of stairs, the generally horizontally disposed portions being adapted to be grasped by a user without bending his or her wrist forwardly in descending the flight of stairs. The handrail is mounted relative to the stairway so that each of the generally horizontally and vertically disposed portions is disposed generally above a step and a riser of the stairway, respectively. Preferably, the generally horizontally disposed portions of the handrail may have a width greater than the generally vertically disposed portions so that the user can grasp and lean on the generally horizontally disposed portions for support in descending the flight of stairs. Preferably, the handrail includes an anti-slip means provided thereon which includes a plurality of grooves extending longitudinally thereof. The handrail may include indicia thereon for aiding a visually handicapped person in moving up and down the stairway, and the indicia are in the Braille system, including characters to be felt and distinguished by human fingers.

In accordance with a further embodiment of the invention, there is provided a handrail assembly adapted for use in a mass transit system, including a handrail having a generally wavy shape, the handrail comprising an alternating combination of generally upwardly and downwardly curved sections: Means are provided for rigidly mounting the handrail generally horizontally below a ceiling of a car of a mass transit system.

A plurality of flexible straps depend from the handrail and a plurality of grip rings are movably connected to the lower ends of the plurality of flexible straps, allowing the handrail and the grip rings to be grasped by passengers in keeping a standing position in a moving mass transit system.

Preferably, the plurality of flexible straps are of equal length and have their upper ends secured to the handrail at the upwardly and downwardly curved sections thereof to provide the grip rings at two different levels.

BRIEF DESCRIPTION OF THE DRAWING

For a more complete understanding of the present invention, and the advantages thereof, reference may be made to the following written description of exemplary embodiments, taken in conjunction with the accompanying drawings.

DETAILED DESCRIPTION OF THE INVENTION

Figure 1:
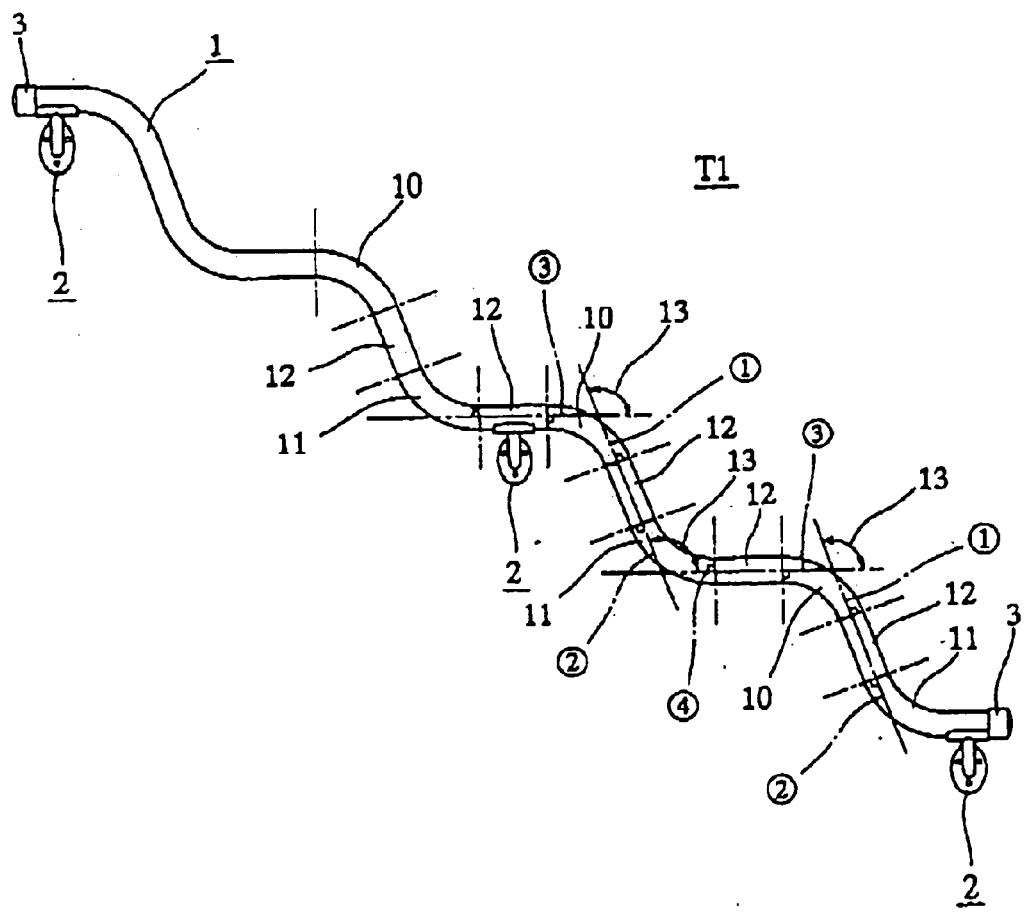
FIG. 1 is a front elevation of a first embodiment of a handrail adapted for use with a stairway.
Figure 2:
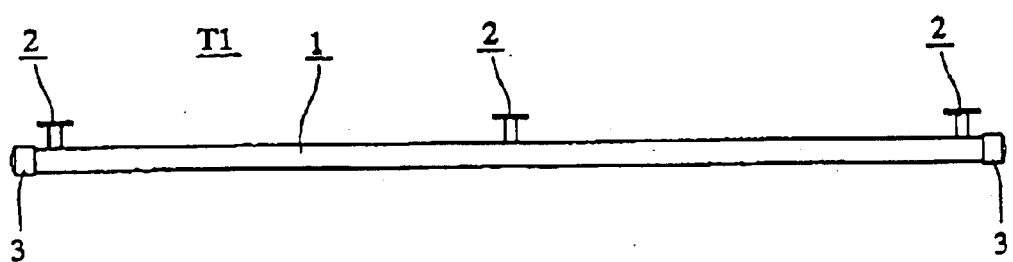
FIG. 2 is a plan view of the handrail as shown in FIG. 1.
Figure 3:
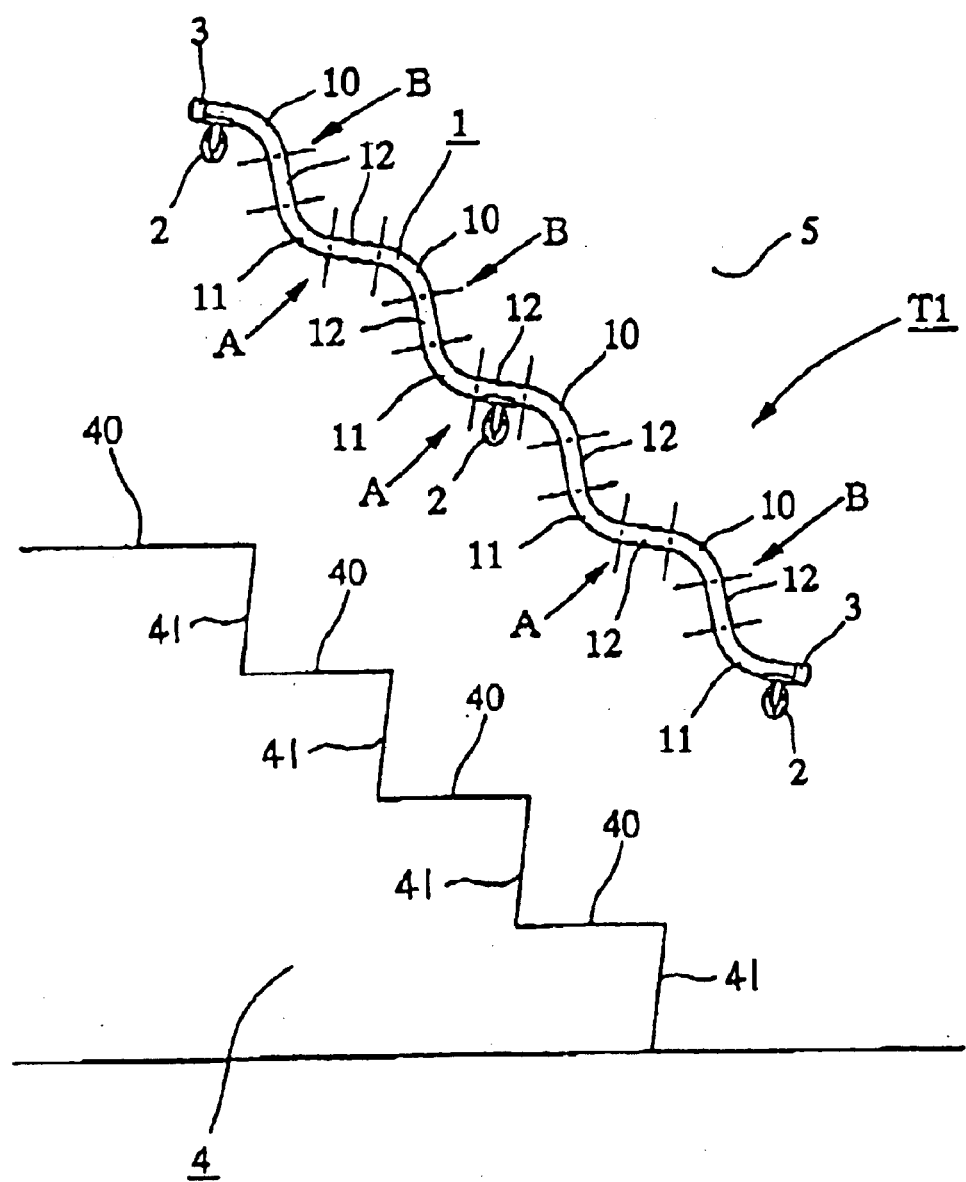
FIG. 3 is a front elevation of the first embodiment of the handrail as mounted on a wall for a stairway.

A first embodiment of the invention is shown in FIGS. 1, 2 and 3. A handrail assembly, as generally designated at T1, includes a handrail 1, conventional supports 2, and caps 3 mounted at both ends of the handrail 1. The handrail 1 comprises an elongated, solid body made of hard plastic material having a generally circular cross section. It should be understood that the handrail may be fabricated from a hollow pipe made of certain metal. It should be noted that, as best shown in FIGS. 1 and 3, the handrail 1 has a wavy, or generally sinusoidal, shape for reasons to be fully described later.

The wavy-shaped handrail 1 comprises a repetitive occurrence of three different sections, i.e., a upwardly curved section 10, a downwardly curved section 11, and a generally straight section 12 of a predetermined length interposed between two adjacent, upwardly and downwardly curved sections 10, 11. Virtual boundaries between the upwardly or downwardly curved sections 10, 11 and the interposed, generally straight section 12 are generally indicated by broken lines extending perpendicular to the handrail 1 at those boundaries. It should be noted that virtual axes ①, ②, ③, ④ extending through two adjacent ones of the generally straight sections 12 intersect with each other at an obtuse angle 13.

In the first embodiment of the invention, the handrail 1 has a diameter of approximately 34 mm and the radius of curvature of the upwardly and downwardly curved sections 10 and 11 is approximately 100 mm. The length of the generally straight section 12 is approximately 93 mm and two adjacent ones of the generally straight sections 12 intersect with each other at an angle of approximately 100 degrees. Also, the total length of the handrail 1 as measured between both ends is approximately 1500 mm.

Referring to FIG. 3, the handrail assembly T1 is shown as mounted on a wall 5 by three conventional supports 2 relative to a stairway 4. As shown, the handrail 1, as a whole, extends obliquely along the stairway 4 so that each generally horizontally disposed portion A and each generally vertically disposed portion B both consisting of the generally straight sections 12 and portions of their adjacent curved sections 10 and 11 are disposed generally above a step 40 and a riser 41 between two adjacent steps 40, respectively. The relative level of the handrail 1 and the stairway 4 may vary depending upon the average height of users and, it is preferable to mount the handrail at a level corresponding to the user's waist portion.

With this arrangement, the user, in ascending a flight of stairs, can first grasp the generally vertically disposed portion B of the handrail 1 more firmly and smoothly than a conventional straight handrail without bending or cocking his or her wrist forwardly, because the handrail 1 is more vertical than the conventional one. Then, the user can grasp and lean on the generally horizontally disposed portion A of the handrail 1, because the portion A has much less slope than the conventional handrail.

It should be appreciated by those skilled in the art that the wavy shaped handrail 1 is best suited to infirm persons such as elderly or disabled persons in that, during ascending, they can grasp the vertically and horizontally disposed portions B and A firmly with a reduced risk of accidental slippage of their hands from gripping engagement with the handrail. Gripping the generally vertically disposed portions B and then the generally horizontally disposed portions A will enable such persons to pull themselves up and then support their own weight.

In descending a flight of stairs, it will be appreciated by those skilled in the art that the user will rely mainly on the generally horizontally disposed portions A for support because their slope is much less than the conventional handrail. With a reduced slope of the handrail, the user can grasp the horizontally disposed portions A without bending or cocking his or her wrist forwardly and with his or her hand just by the side of the waist portion. Accordingly, it should be understood that infirm persons such as elderly or disables persons can grasp the generally horizontally disposed portions A firmly and smoothly with a much less risk of accidental slippage of their hands from the handrail than the conventional one.

Also, it should be understood that the generally straight sections 12 are generally easier to grip than the upwardly and downwardly curved portions 10 and 11. Accordingly, it should be readily understood that the user is recommended to grasp the generally straight section 12 of the generally vertically disposed portions B during ascending and the generally straight section 12 of the generally horizontally disposed portions A during descending because to do so will reduce the risk of accidental slippage of his or her hands from gripping engagement with the handrail.

As described above, the axes of two adjacent ones of the generally straight sections 12 are arranged to intersect with each other at an obtuse angle 13 of 100 degrees, for example, so that a relatively smooth transition occurs between the generally horizontally and vertically disposed portions A and B. This will enable the user to slide his or her hands from one to the other of the portions A and B without substantially detaching from the handrail.

As described above, the generally horizontally and vertically disposed portions A and B are arranged in relation to the stairway 4 such that the portions A and B are disposed generally above the steps 40 and the risers 41 there between, respectively. This will permit the user to readily grasp the portions A and B depending upon whether he or she is descending or ascending a flight of stairs.

Figure 4:
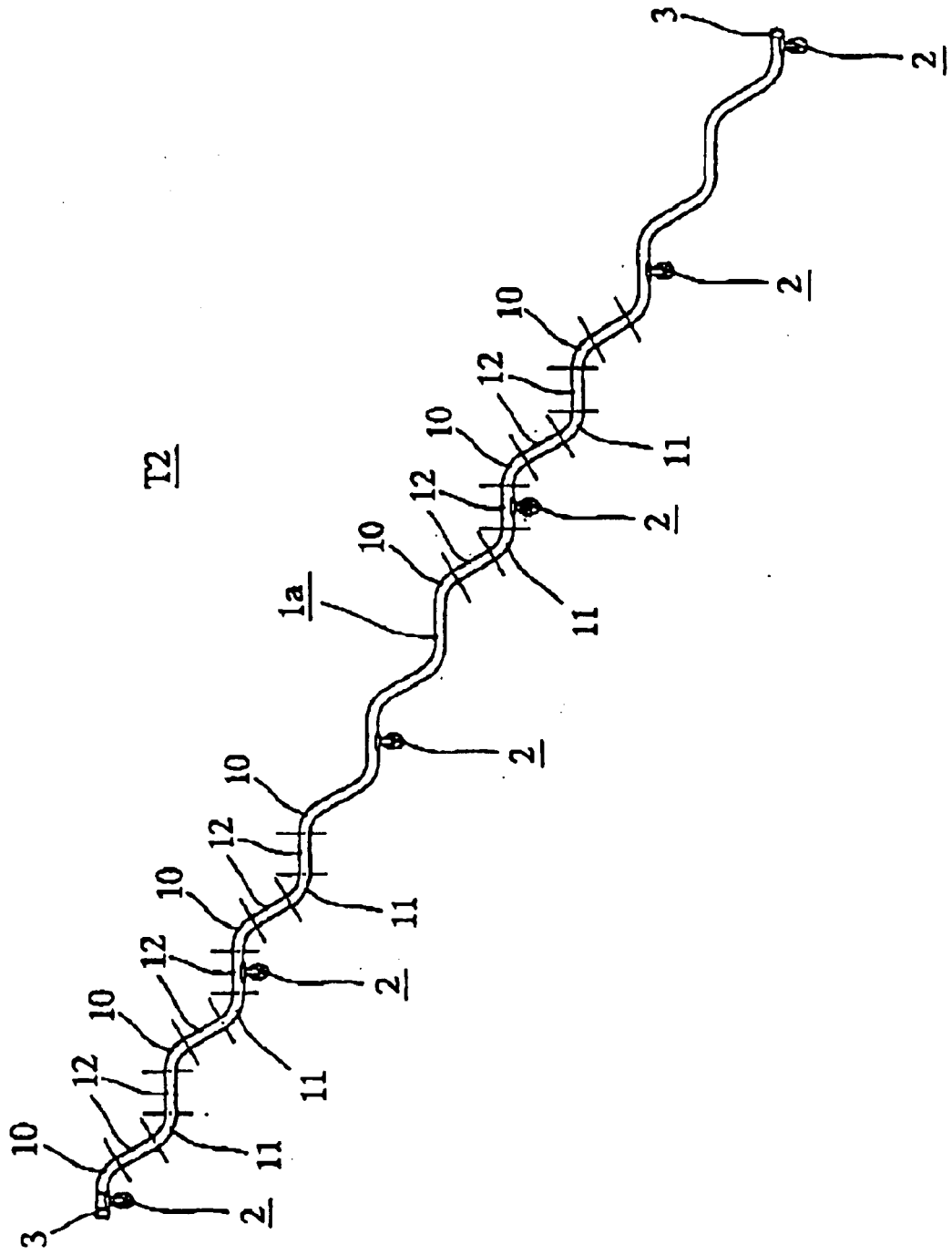
FIG. 4 is a front elevation of a second embodiment of a handrail adapted for use with a stairway.
Figure 5:
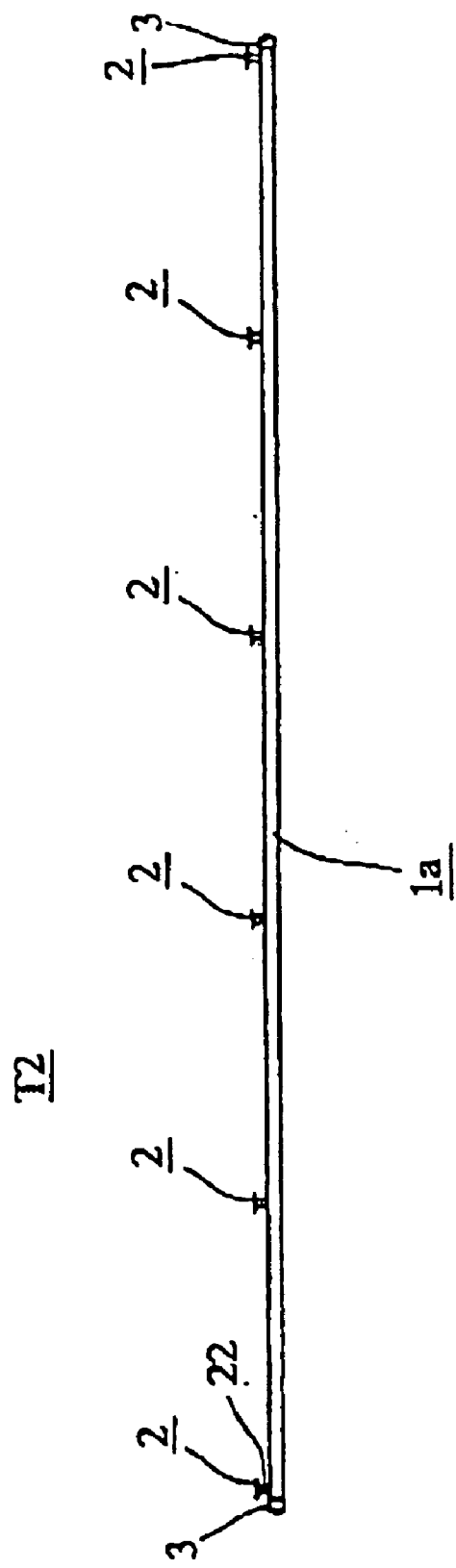
FIG. 5 is a plan view of the handrail as shown in FIG. 4.
Figure 6:
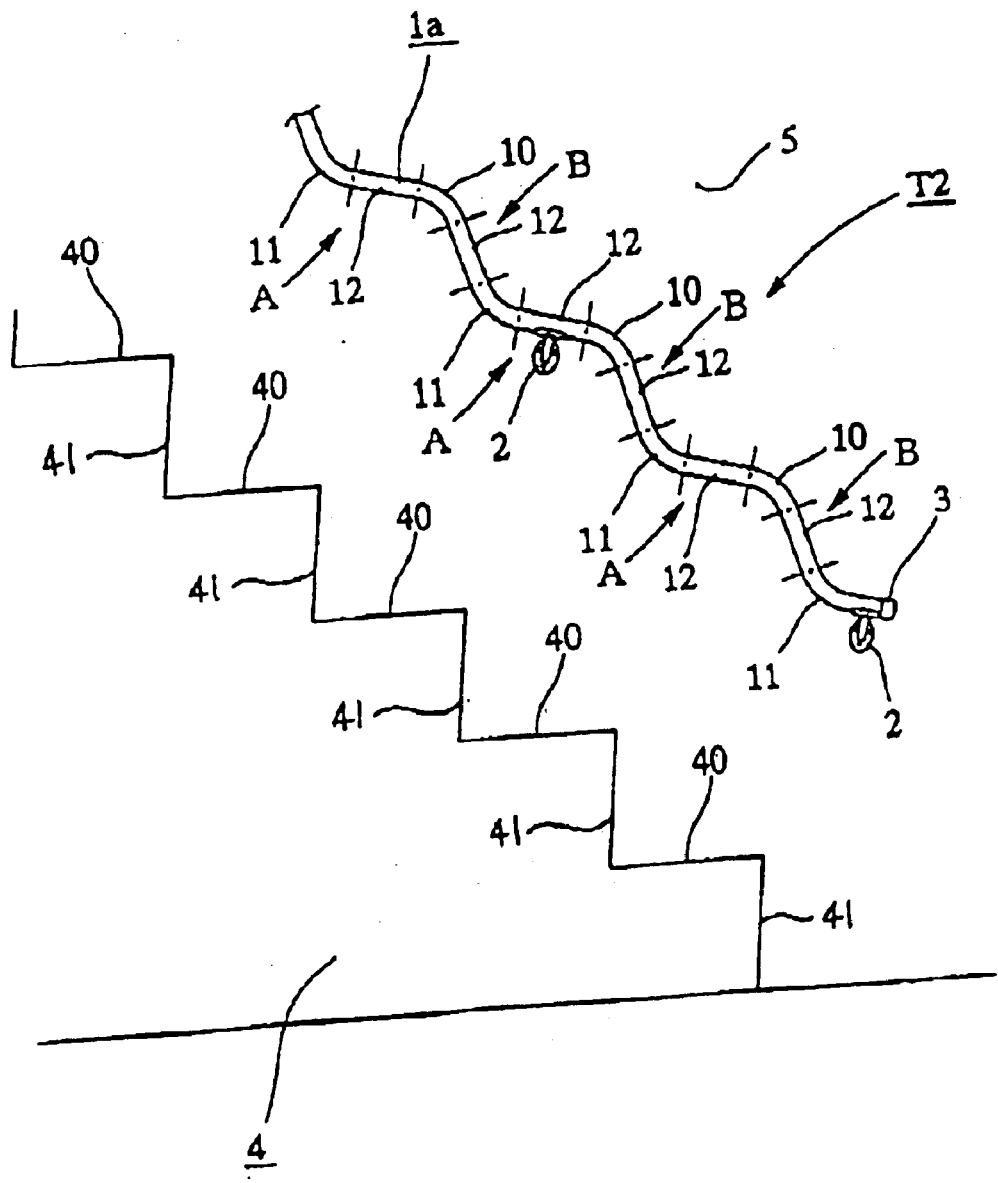
FIG. 6 is a front elevation of the second embodiment of the handrail as mounted on a wall for a stairway.

Referring to FIGS. 4 to 6, there is illustrated a second embodiment of the invention T2 which includes a handrail 1 a mounted on a wall by conventional supports 2 for a stairway 4. As shown, the handrail assembly T2 includes five supports 2 mounted to the generally straight portions 12 of the handrail 1a at an equal spacing from each other. In this second embodiment of the invention, the handrail 1a has a diameter of approximately 34 mm and the radius of curvature of the upwardly and downwardly curved sections 10 and 11 is approximately 100 mm. The length of the generally straight sections 12 is approximately 130 mm and two adjacent ones of the generally straight sections 12 intersect each other at an angle 13 of approximately 105 degrees. Also, the total length of the handrail 1a as measured between both ends is approximately 4000 mm.

As described above in connection with the first embodiment, it is preferable to mount the handrail 1a of the invention relative to a stairway 4 such that the generally horizontally disposed portions A and the generally vertically disposed portions B are positioned generally above the steps 40 and the risers 41, respectively. However, it should be understood that the present invention is not limited to such relative positioning of the handrail and the stairway.

Figure 7:
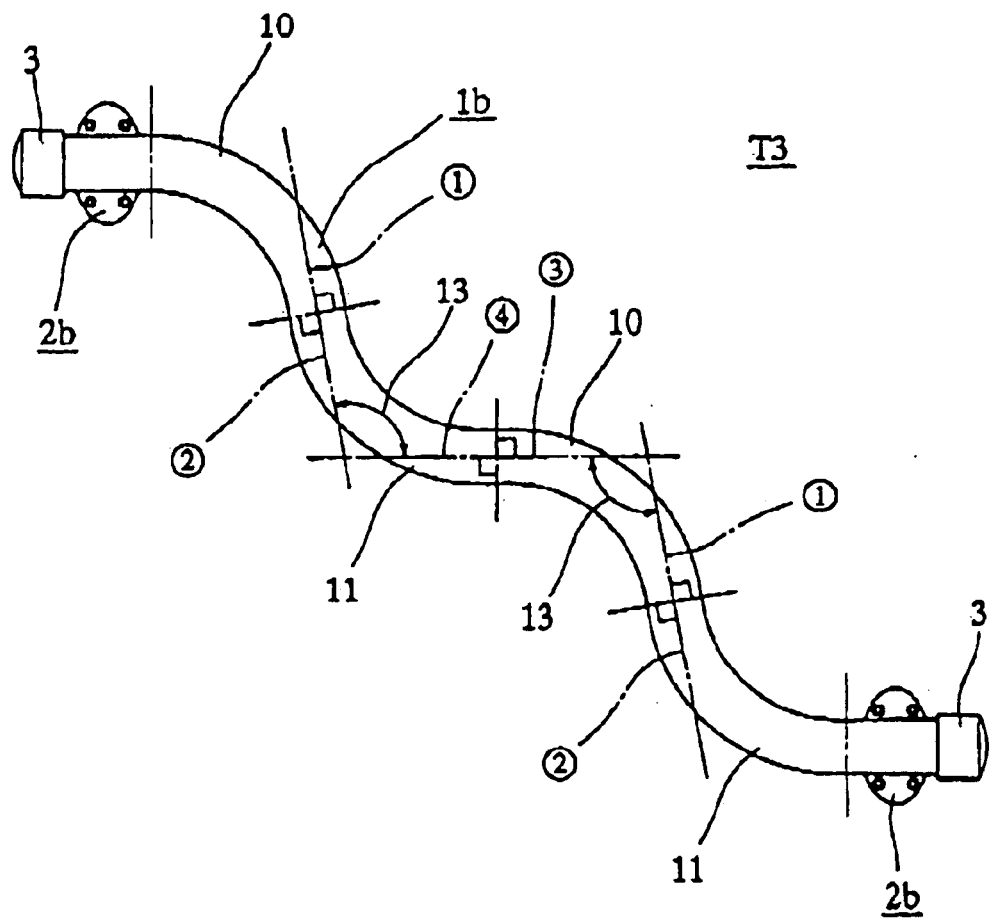
FIG. 7 is a front elevation of a third embodiment of a handrail adapted for use in a toilet.
Figure 8:
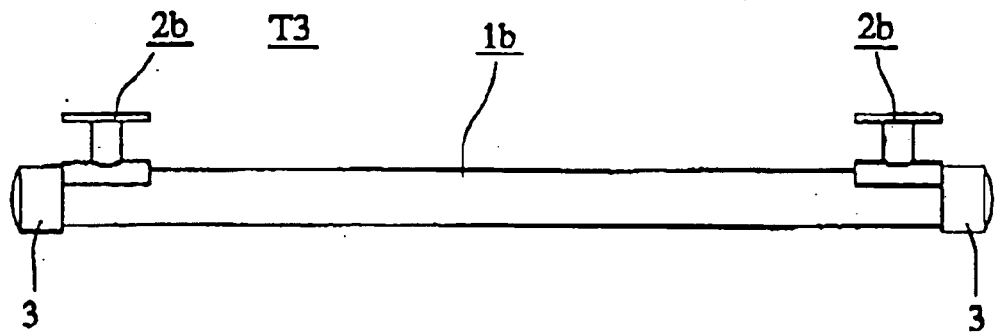
FIG. 8 is a plan view of the handrail as shown in FIG. 7.
Figure 9:
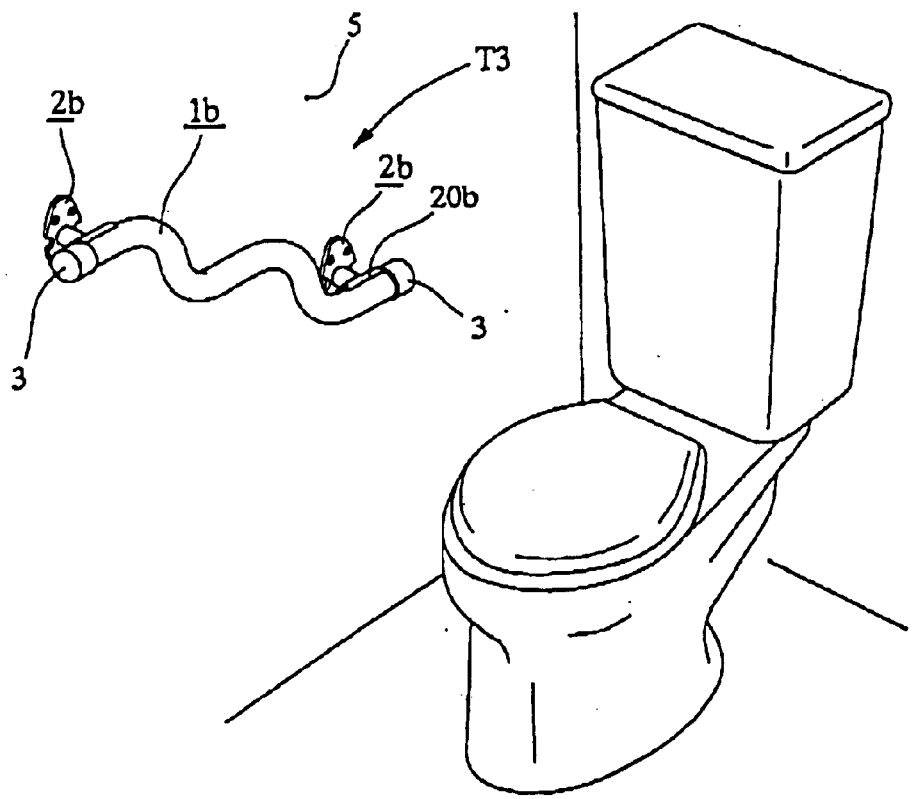
FIG. 9 is a perspective view of the third embodiment of the handrail as mounted in a toilet.

Referring to FIGS. 7 to 9, there is illustrated a third embodiment of the present invention T3 which includes a handrail 1b mounted on a wall 5 by conventional supports 2b in a toilet. The handrail 1b is generally wavy-shaped, including two generally upwardly curved sections 10 and two generally downwardly curved sections 11. However, it does not include a plurality of generally straight sections 12 as is the case with the handrails 1 and 1a as shown in FIGS. 1 to 6. The handrail 1b is also provided with caps 3 at both ends.

In this third embodiment of the invention, the handrail 1b has a diameter of approximately 34 mm and the radius of curvature of the upwardly and downwardly curved sections 10 and 11 is approximately 100 mm. Two adjacent ones of the generally straight sections 12 intersect with each other at an angle 13 of approximately 95 degrees. Also, the total length of the handrail 1b as measured between both ends is approximately 600 mm.

As best shown in FIG. 9, the handrail 1b is mounted generally obliquely on the wall 5 by conventional supports 2c so as to provide an alternating combination of generally horizontally and vertically disposed portions which comprise the generally downwardly and upwardly curved sections and transition sections there between.

In lifting oneself onto the toilet, the user will grasp either the generally vertically or horizontally portions of the handrail 1b for support and gradually slide his or her hand downwardly along the handrail while supporting his or her own weight. By so doing, the user does not have to stretch his or her arm. This will also enable the user to maintain his or her grip on the handrail during sliding so that the risk of injury by the user falling onto the toilet will be greatly reduced.

In standing up from the toilet, the user may well grasp either the generally horizontally or vertically portions of the handrail 1b located at a position easier to grasp, and then pull oneself up and support his or her own weight. It should be noted that the curvature of the curved portions 10, 11 serves to prevent accidental slippage of the user's hand leading to injury due to falling onto the toilet. It should also be noted that although the handrail 1b is shown as mounted obliquely with respect to the toilet floor, the present invention is not limited to such mounting of the handrail and that it can be mounted generally parallel or perpendicular to the toilet floor.

Figure 10:
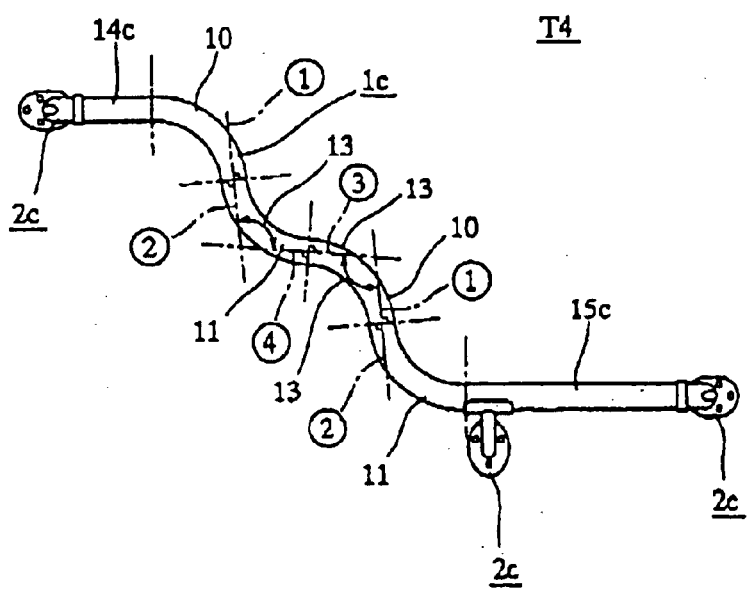
FIG. 10 is a front elevation of a fourth embodiment of a handrail adapted for in a toilet.
Figure 11:
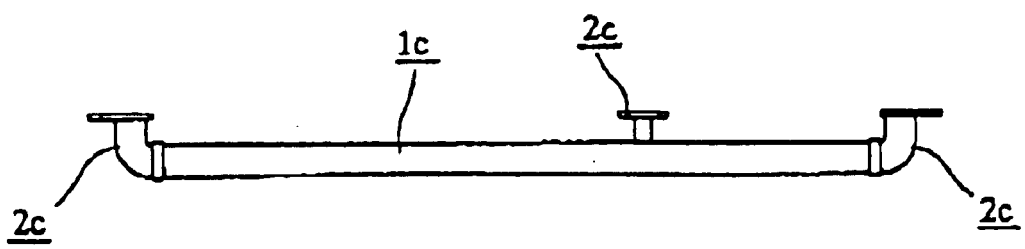
FIG. 11 is a plan view of the handrail as shown in FIG. 10.
Figure 12:
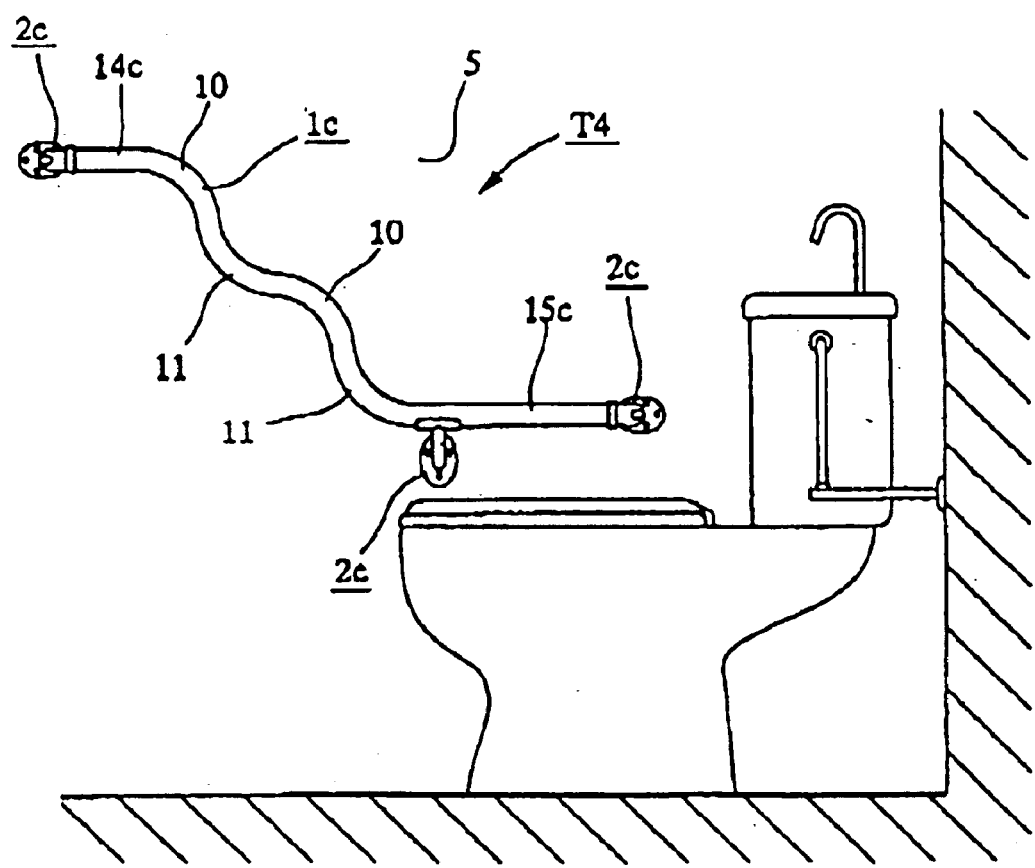
FIG. 12 is a front elevation of the fourth embodiment of the handrail as mounted in a toilet.

Referring to FIGS. 10 to 12, there is illustrated a fourth embodiment of the invention T4 which is generally similar in construction to the third embodiment T3. As shown, the handrail 1c additionally includes two straight sections 14c and 15c disposed near both ends of the handrail 1c. Both of the straight sections 14c, 15c are generally parallel not only to each other but also to the toilet floor. The handrail 1c is mounted on a wall 5 obliquely with the straight section 15c located just by the side of the toilet seat so that it can be readily engaged by the hand of the user. A conventional cap 3 is mounted at each end of the handrail 1c. A generally straight section 12 is not provided between two adjacent, generally upwardly and downwardly curved sections 10 and 11 unlike the first and second embodiments of the invention.

In this fourth embodiment of the invention, the handrail 1c has a diameter of approximately 32 mm and the radius of curvature of the upwardly and downwardly curved sections 10 and 11 is approximately 110 mm. The lengths of the straight sections 14c and 15c are approximately 100 and 300 mm, respectively.

Figure 13:
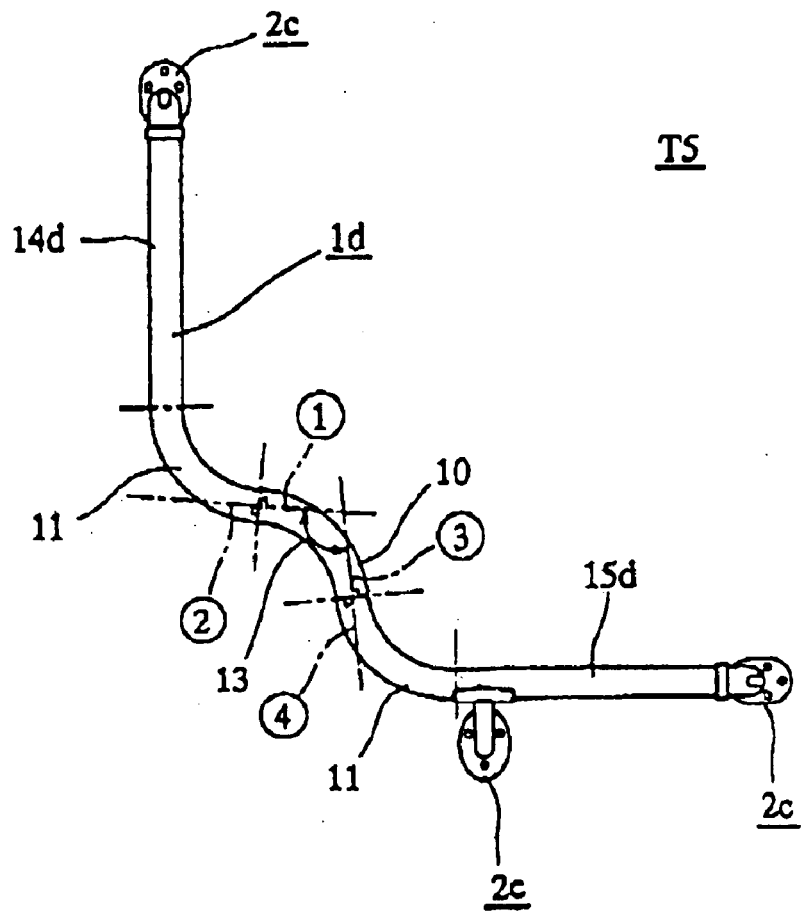
FIG. 13 is a front elevation of a fifth embodiment of a handrail adapted for use in a toilet.
Figure 14:
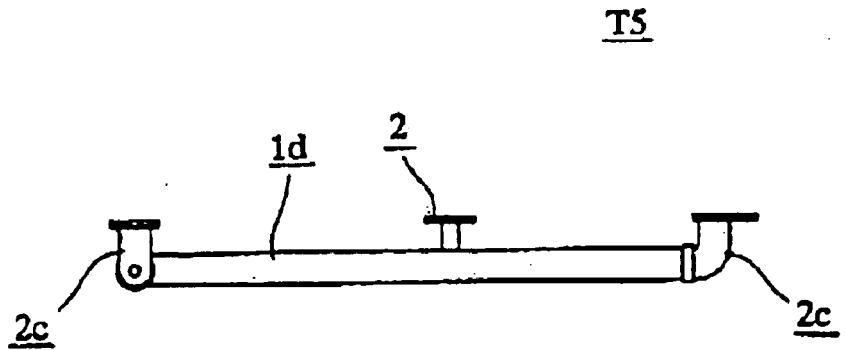
FIG. 14 is a plan view of the handrail as shown in FIG. 13.
Figure 15:
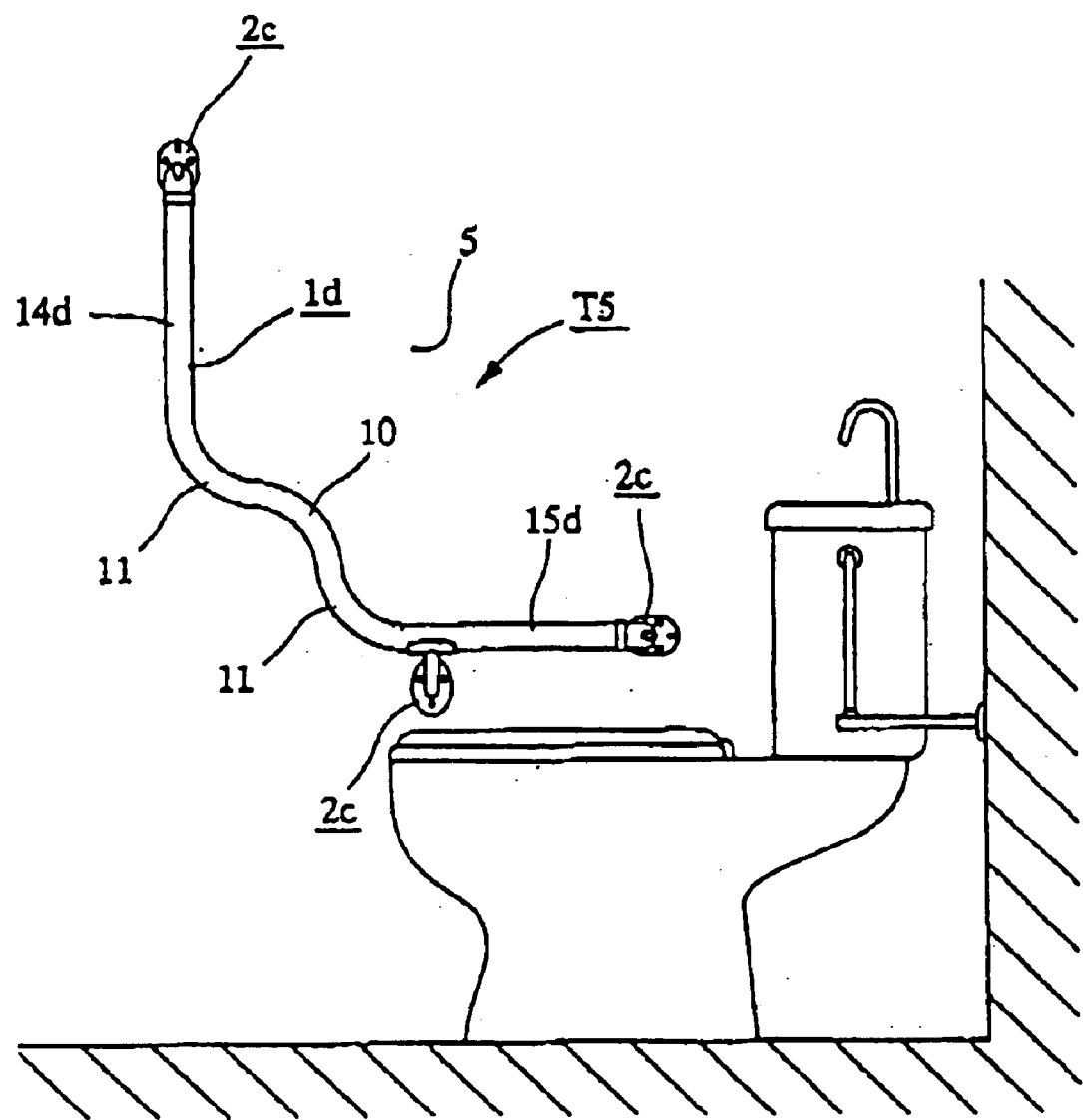
FIG. 15 is a front elevation of the fifth embodiment of the handrail as mounted in a toilet.

Referring to FIGS. 13 to 15, there is illustrated a fifth embodiment of the invention T5 which is adapted for use in a toilet or a bathtub. As shown, the handrail 1d includes two straight sections 14d and 15d disposed near both ends thereof. These straight sections 14d, 15d are disposed generally vertically and horizontally, respectively. Unlike the first and second embodiments of the invention, such a generally straight section 12 is not provided between two adjacent, generally upwardly and downwardly curved sections 10 and 11. In this fifth embodiment, the handrail 1d has a diameter of approximately 32 mm and the radius of curvature of the upwardly and downwardly curved sections 10 and 11 is approximately 110 mm. The length of the straight sections 14d and 15d is approximately 300 mm.

Figure 16:
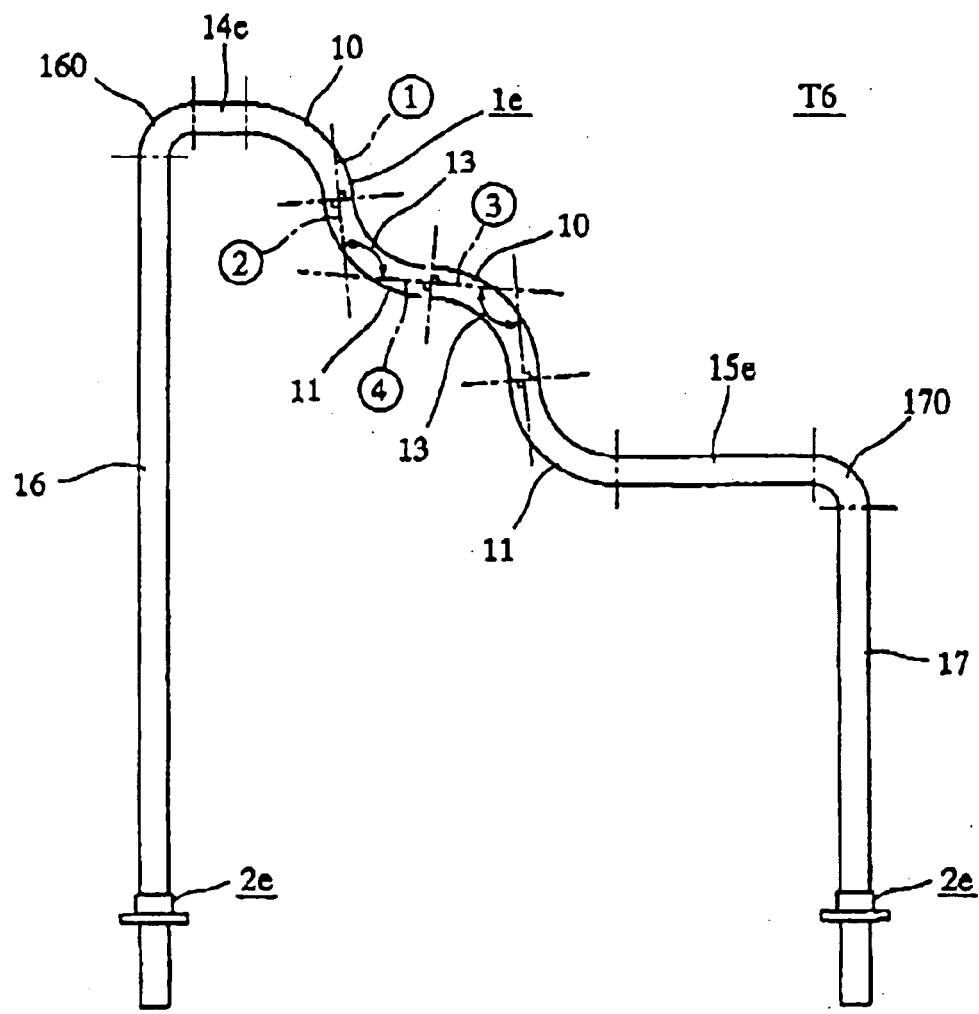
FIG. 16 is a front elevation of a sixth embodiment of a handrail adapted for use in a toilet.
Figure 17:
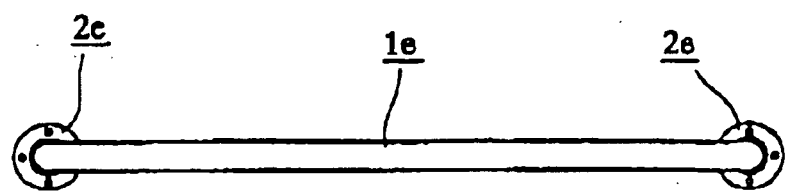
FIG. 17 is a plan view of the handrail as shown in FIG. 16.
Figure 18:
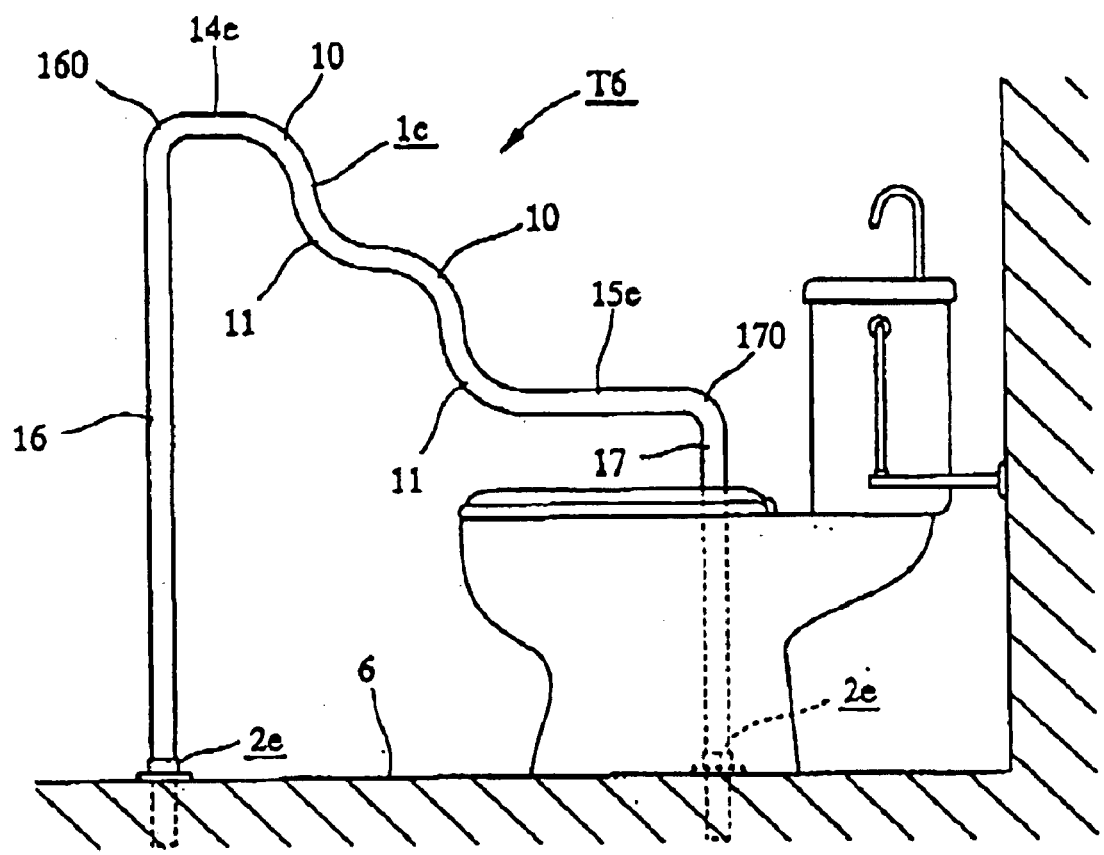
FIG. 18 is a front elevation of the sixth embodiment of the handrail as mounted in a toilet.

Referring to FIGS. 16 to 18, there is illustrated a sixth embodiment of the invention T6 which is adapted for use in a toilet or bathtub. As seen, the handrail assembly T6 differs from that T4 as shown in FIGS. 10 to 12 in that the handrail 1e is mounted on a floor 6 rather than on a wall. As shown, the handrail 1e additionally includes vertically disposed, post sections 16 and 17 whose lower ends are mounted on the floor by conventional mounting members 2e.

In this sixth embodiment, the handrail 1e has a diameter of approximately 34 mm and the radius of curvature of the upwardly and downwardly curved sections 10 and 11 is approximately 110 mm. The lengths of the horizontally disposed, straight sections 14e and 15e are approximately 150 and 300 mm, respectively. The vertically disposed post sections 16 and 17 are approximately 800 and 600 mm, respectively. Also, the radius of curvature of generally upwardly curved sections 160 and 170 located between the straight sections 14e, 15e and the post sections 16, 17 is approximately 35 mm.

Figure 19:
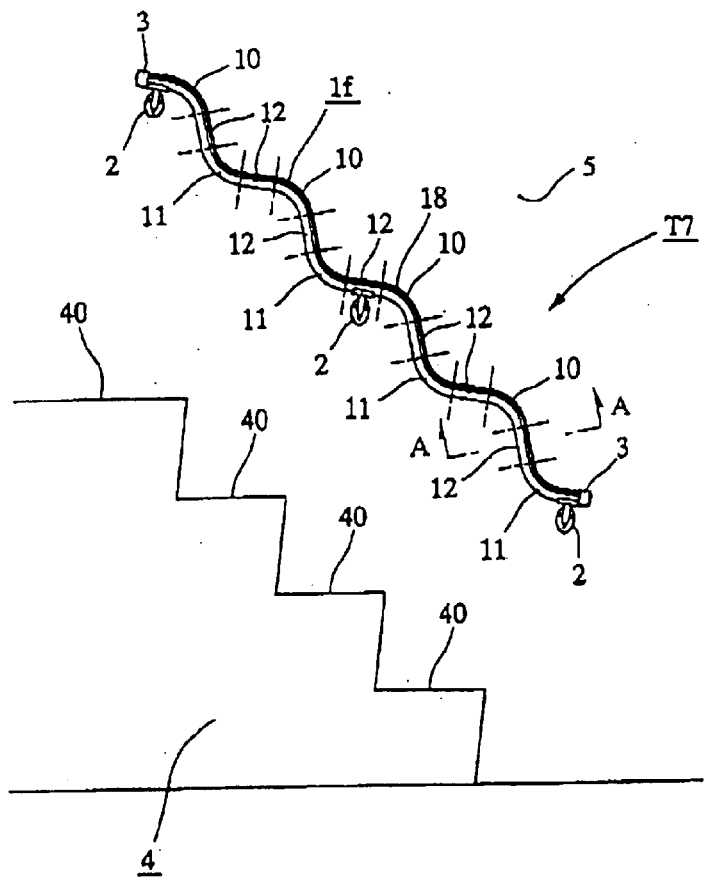
FIG. 19 is a front elevation of a seventh embodiment of a handrail as mounted relative to a stairway.
Figure 20:
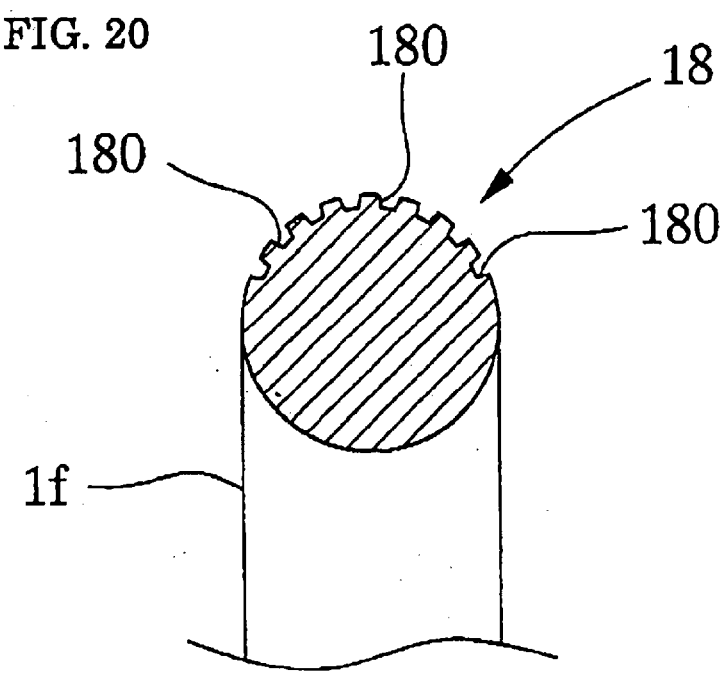
FIG. 20 is a cross-sectional view of the handrail as taken along lines A—A of FIG. 19.

Referring to FIGS. 19 to 20, there is illustrated a seventh embodiment of the invention T7 which is adapted for use with a stairway 4. As depicted, the handrail assembly T7 is different from that T1 as shown in FIG. 3 in the inclusion of an anti-slip mechanism 18.

This anti-slip mechanism 18 serves to prevent accidental slippage of user's hands from grasping engagement with a handrail 1f during ascending and descending. The anti-slip mechanism 18 may be in the form of grooves 180 formed in the upper half circumference of the handrail 1f and extending longitudinally thereof, as shown in FIG. 20. Alternatively, the grooves may be formed to extend circumferentially of the handrail. Other forms of anti-slip mechanisms may be provided using, for example, anti-slip pads adhered to the handrail or material having an inherent anti-slip or frictional property. With this anti-slip mechanism used, the user can safely ascend or descend a flight of stairs by firmly grasping the handrail.

Figure 21:
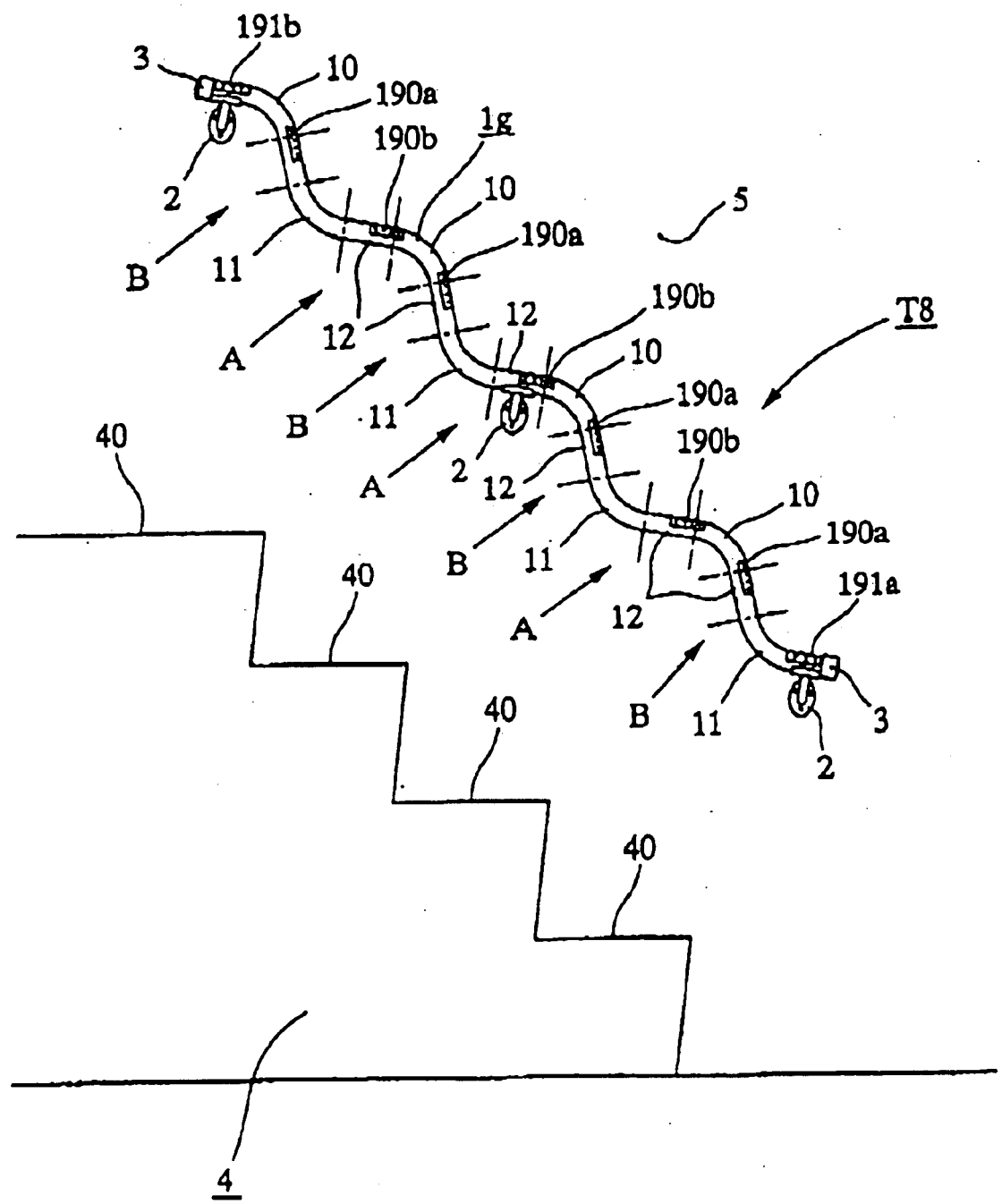
FIG. 21 is a front elevation of the eighth embodiment of the handrail as mounted on a wall for a stairway.

Referring to FIG. 21, there is illustrated an eighth embodiment of the invention T8 which is adapted for use with a stairway 4. The handrail assembly T8 as shown differs from that T7 as shown in FIG. 19 in the provision of indicia 190a, 190b, 191a and 191b on the handrail 1g for aiding a visually handicapped person in moving up and down stairs.

The indicia 190a, 190b, 191a and 191b are in the Braille system and include characters to be felt and distinguished by human fingers. As shown, these indicia are disposed on the upper side of the handrail 1g. Alternatively, the indicia may be disposed on the lower side of the handrail so that when a visually handicapped person manually grips the handrail, their fingers will be wrapped around the lower side of the handrail and will engage the characters of the indicia for manual reading.

There are four groups of indicia, namely, indicia 190a and 190b disposed on the generally vertically and horizontally disposed portions B and A of the handrail 1g, respectively, and also indicia 191a and 191b associated with the first or lower step and the last or top step of the stairway 4, respectively.

The indicium 191a may include characters indicating the numeral 1 or the number of steps to go before reaching the top of the flight of stairs. In a like manner, the indicium 191b may include characters indicating the numeral corresponding to the top of the flight of stairs or the number of steps to go before reaching the bottom of the stairway.

Each indicium 190a, which is disposed on a generally vertically disposed portion B, may include characters setting forth the number corresponding to the step associated with the portion B or the number of steps to go before reaching the top of the flight of stairs. In a like manner, each indicium 190b, which is disposed on a generally horizontally disposed portion A, may include characters indicating the number corresponding to the step associated with the portion A or the number of steps to go before reaching the bottom of the flight of stairs. It should be understood that the indicia 190a, 190b, 191a and 191b may include characters setting forth the nature or appearance of the top or bottom floor of the stairway.

Although the indicia 190a, 190b, 191a and 191b could be provided on the handrail in a variety of ways, it may be preferred to form the indicia on a metal strip or bar with the characters projecting from the base. The metal strip or base may be secured to the handrail 1g with a suitable adhesive or other type of fastener so as to conform to the contour of the handrail. Or alternatively, it may be desirable to mold indicia integrally with a strip base formed of plastic, wood or other material which is subject to minimum wear.

With this arrangement, a visually handicapped person, having knowledge of the Braille system, can distinguish the characters to determine the number of steps in a flight of stairs and/or the location of a step in the flight of stairs.

Figure 22:
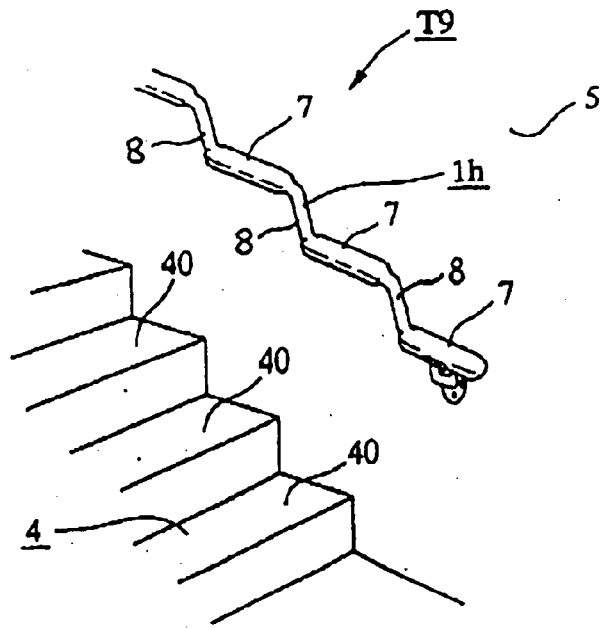
FIG. 22 is a perspective view of a ninth embodiment of a handrail as mounted on a wall for a stairway.

Referring to FIG. 22, there is illustrated a ninth embodiment of the invention which is adapted for use with a stairway. As depicted, the handrail 1h includes an alternating combination of generally horizontally disposed sections 7 and generally vertically disposed sections 8 wherein the former sections 7 have a lateral dimension greater than the latter sections 8. The former or generally horizontally disposed sections 7 are generally oblong in cross section and have a wider upper surface so that the user can temporarily lean on it by his or her elbow for support in ascending or descending the flight of stairs. This will aid infirm persons such as elderly or disabled persons in ascending or descending the flight of stairs.

Figure 23:
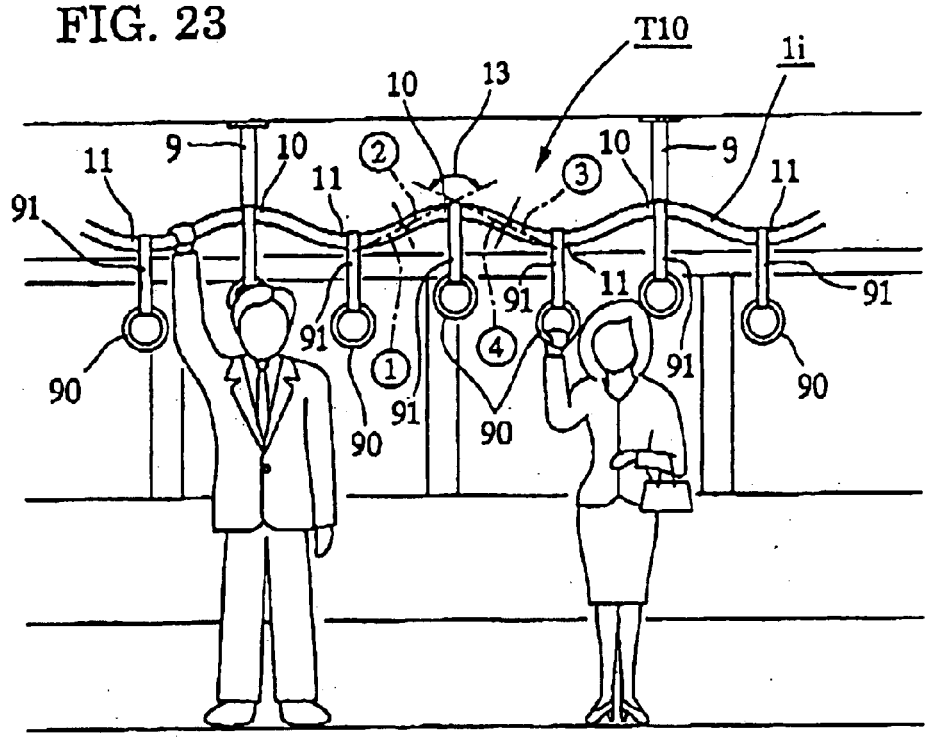
FIG. 23 is a pictorial view of a tenth embodiment of a handrail as mounted in a car of a commuter train.

Referring to FIG. 23, there is illustrated a tenth embodiment of the invention T10 which is adapted for use with a mass transmit system such as a commuter train, a bus, a subway, a street car or the like. As shown, the handrail assembly T10 includes a wavy-shaped handrail 1i mounted generally horizontally below a ceiling of a car of a commuter train. A plurality of depending support posts 9 are used to rigidly mount the handrail 1i relative to the car structure. Each support post 9 has its upper end fixed to the ceiling and its lower end secured to upwardly curved sections 10 of the handrail 1i.

The handrail assembly T10 also includes a plurality of flexible straps 91 depending from the handrail 1i that assists passengers in keeping a standing position in the moving car. As shown, all of the straps 91 have their lower ends connected to grip rings 90 to enable the passengers to grip them readily. The straps 91 have their upper ends secured to either the upper or downwardly curved sections 10, 11. Since the straps 91 are of equal length, the grip rings 90 are at two different levels depending upon the location of the straps along the handrail 1i. This will provide flexibility to passengers in selecting which straps they should use in keeping themselves in a standing position.

In this tenth embodiment of the invention, the handrail 1i has a diameter of approximately 34 mm and the radius of curvature of the upwardly and downwardly curved sections 10, 11 is approximately 350 mm.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A handrail assembly adapted for use with a stairway, comprising:

a handrail having a generally wavy shape; and means for mounting said handrail obliquely along a stairway to provide an alternating combination of generally horizontally disposed portions and generally vertically disposed portions, said generally vertically disposed portions being adapted to be grasped by a user without bending his or her wrist forwardly in ascending a flight of stairs, said generally horizontally disposed portions being adapted to be grasped by the user without bending his or her wrist forwardly in descending the flight of stairs; and wherein said handrail is mounted relative to the stairway so that each of the generally horizontally and vertically disposed portions is disposed generally above a step and a riser of the stairway, respectively.

2. The handrail assembly as defined in claim 1 wherein said generally horizontally disposed portions of the handrail have a width greater than said generally vertically disposed portions so that the user can grasp and lean on said generally horizontally disposed portions for support in descending the flight of stairs.

3. The handrail assembly as defined in claim 1 wherein said handrail includes an anti-slip means provided thereon.

4. The handrail assembly as defined in claim 3 wherein said and-slip means comprises a plurality of grooves extending longitudinally of the handrail.

* * * * *